C. RITTER.
CONDIMENT HOLDER.
APPLICATION FILED NOV. 12, 1913.
1,114,807.
Patented Oct. 27, 1914.
2 SHEETS—SHEET 2.
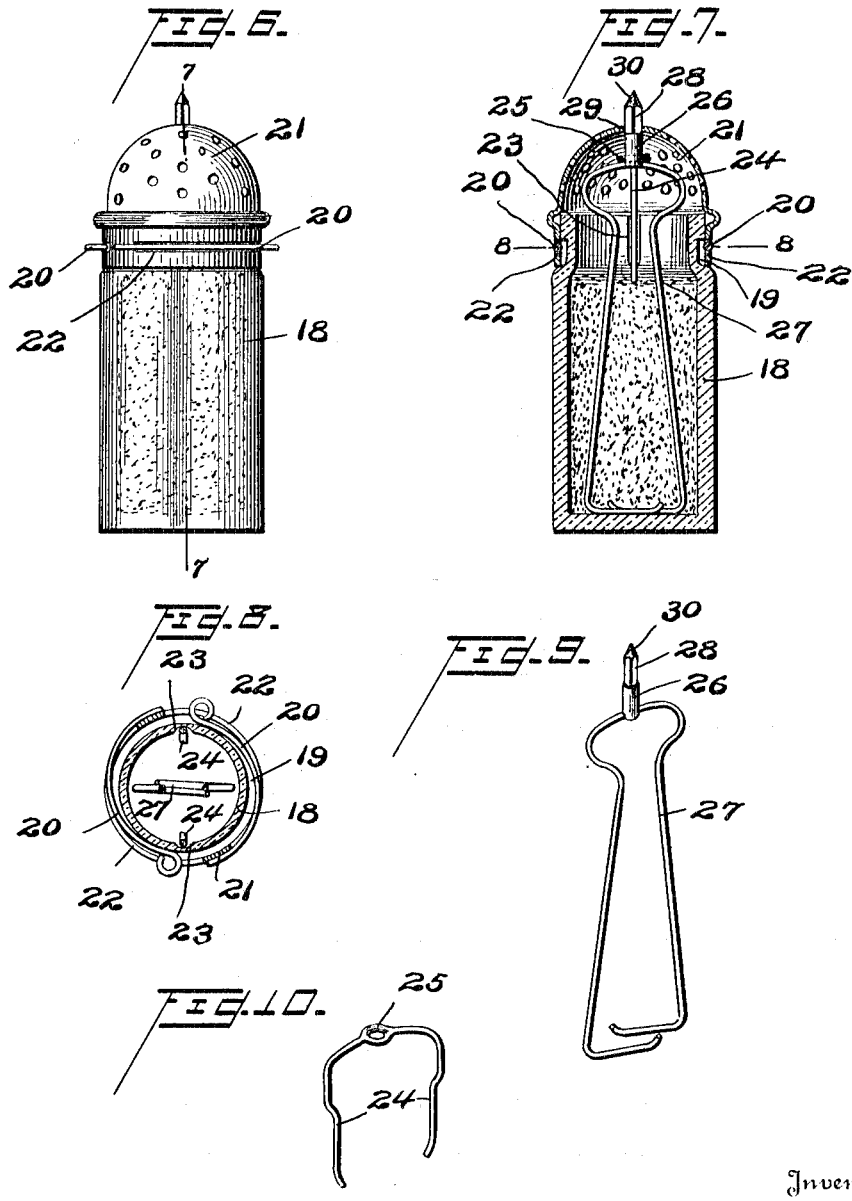
Inventor
Clyde Ritter.
Witnesses
Harold Strauss
C. R. Ziegler.
By Joshua R. H. Potts.
Attorney

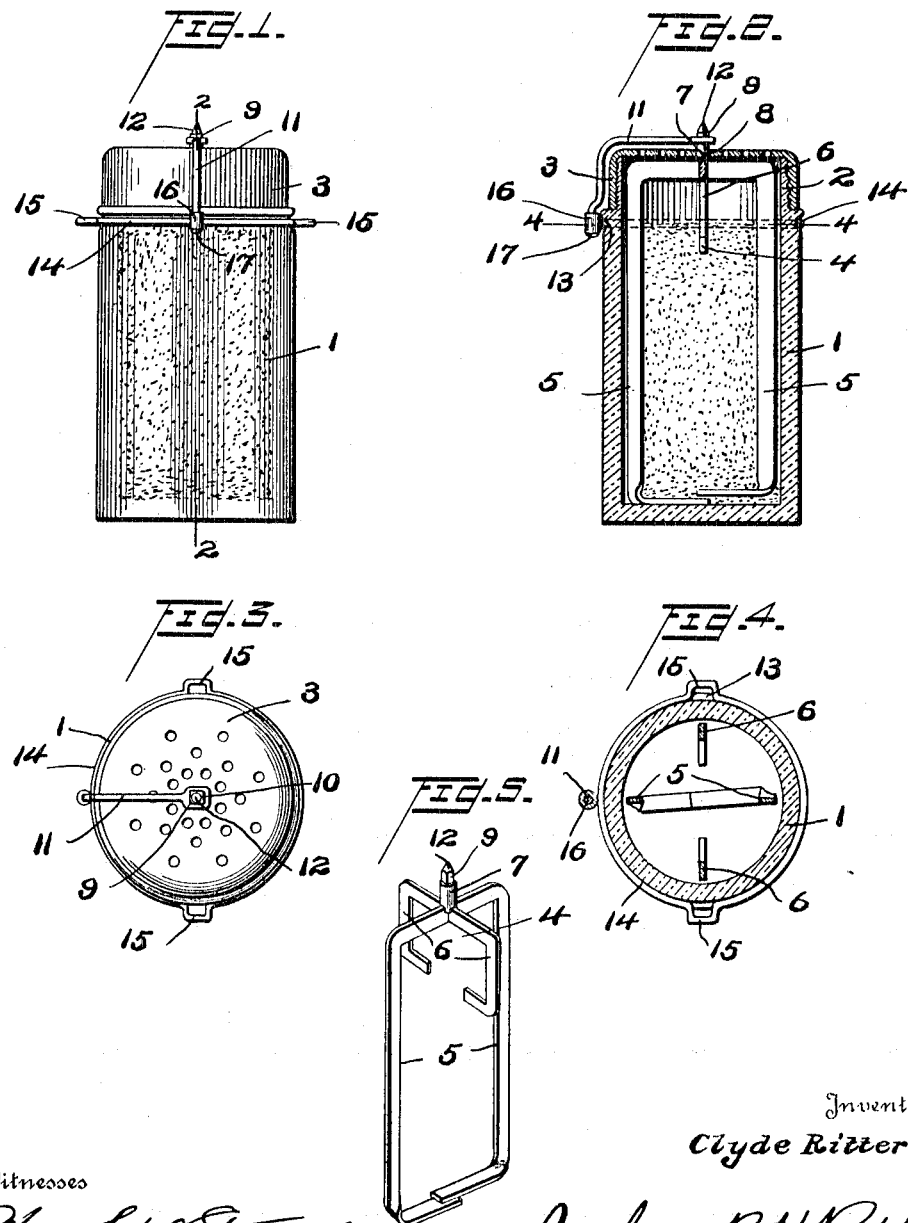

UNITED STATES PATENT OFFICE.

CLYDE RITTER, OF BRIDGETON, NEW JERSEY.

CONDIMENT-HOLDER.

1,114,807.  Specification of Letters Patent.  Patented Oct. 27, 1914.

Application filed November 12, 1913. Serial No. 800,472.

*To all whom it may concern:*

Be it known that I, CLYDE RITTER, a citizen of the United States, residing at Bridgeton, in the county of Cumberland and State of New Jersey, have invented certain new and useful Improvements in Condiment-Holders, of which the following is a specification.

My invention relates to improvements in condiment holders, the object of the invention being to provide a condiment holder with improved means for agitating the condiment within the same so as to insure the passage of the condiment through the perforated cover when the holder is inverted.

A further object is to provide improved means of this character which may be revolved relative to the condiment holder without bringing the hands in contact with the perforated end of the cover through which the condiment is discharged.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in longitudinal section on the line 2—2 of Fig. 1. Fig. 3 is a top plan view. Fig. 4 is a view in section on the line 4—4 of Fig. 2. Fig. 5 is a perspective view of the agitator removed. Fig. 6 is a view in elevation illustrating a modification. Fig. 7 is a view in section on the line 7—7 of Fig. 6. Fig. 8 is a view in section on the line 8—8 of Fig. 7. Fig. 9 is a perspective view of the modified form of agitator, and Fig. 10 is a perspective view of the agitator guide.

Referring particularly to Figs. 1 to 5 inclusive, 1 represents a receptacle or body having a screw-threaded open end 2 to receive a perforated cover 3 which is internally screw-threaded and adapted to be removably positioned on the body 1 as is customary with devices of this kind. 4 represents my improved agitator which in the figures above referred to is of sheet metal comprising two pairs of blades 5 and 6, the former longer than the latter and said blades located at right angles to each other and joining at their upper end where they are fixed to a cylindrical journal 7 which projects through a circular opening 8 in the cover 3, and is adapted to turn freely in said opening. It will be noted particularly by reference to Fig. 2 that the upper edges of the blades 5 and 6 scrape against the inner surface of the cover so as to dislodge any condiment sticking to the cover.

The journal 7 near its upper end is made angular as shown at 9 to enter an angular opening 10 in the free end of an arm 11 located above the cover 3. The extreme upper end of the journal 7 is made conical as shown at 12 to guide the arm into position on the angular portion 9 as will more fully hereinafter appear.

Around the body 4, near its open end, an annular groove 13 is provided, in which a ring 14 is mounted to turn. This ring is preferably of a single piece of wire or band having outwardly bent finger holds 15 at opposite sides. At a point between the finger holds 15, a sleeve 16 is fixed to the ring 14 and serves as a bearing for one end of the arm 11, the latter being bent at a substantial right angle as shown most clearly in Fig. 2, and fixed in the sleeve 15 by enlarging its ends 17 to effectually rivet the same within the sleeve, yet allow the arm to turn freely so that it may be moved from its position over the end of the condiment holder and allow the cover 2 to be removed.

When it is desired to fill the body, arm 11 is lifted off the angular portion 9, said arm having sufficient inherent elasticity to permit of this movement. The arm is then swung around to one side of the body so that the cover 2 may be removed. After the body is filled, the cover is replaced and the arm 11 swung back to the position shown. A conical end 12 guides the angular opening 10 in arm 11 onto the angular portion 9 of the journal and should this angular portion be so positioned as not to register with the opening, it is simply necessary to turn the ring 14 slightly until the parts 1 register when the arm will spring into locked position.

In operation, the ring 14 is grasped between the fingers of one hand, finger holds 15 being provided for this purpose and the body 1 grasped between the fingers of the other hand. Either the body or the ring may be turned, which will cause the agitator to revolve within the body and thoroughly agitate the condiment so that in any weather or in any condition the condiment may be freely discharged through the perforated cover.

It will be observed that the free ends of the blades 5 are bent inwardly and hence the agitator will fit various lengths of receptacle by simply bending the free ends of these blades, and while it is my intention to make the device to suit a particular size of receptacle, it frequently happens that there is considerable discrepancy in the blowing of the receptacles, and this form of blade enables the parts to be adjusted to suit any imperfection which may occur in forming the body.

In the modification illustrated in Figs. 6 to 10 inclusive, the body 18 corresponding to body 1, is provided near its open end with an annular groove 19 into which wire springs 20 on a perforated cover 21 project to hold the cover in position on the body.

The springs 20 are attached to the cover and are bowed and project through slots 22 in the cover. They may be readily drawn out of locked engagement to allow the removal of the cover, but when in locked position, permit the cover to freely revolve on the body. In opposite sides of the open end of the body, longitudinal grooves 23 are formed to receive the free ends of a yoke shaped guide 24 which is preferably of wire and arches across the open end of the body. This guide at its intermediate portion, is provided with a circular bearing 25 through which a journal 26 fixed to an agitator 27 projects. The agitator extends down into the body 18 and is adapted when turned to agitate the contents of the body while the upper end of the journal 26 is made angular as shown at 28 and projects through an angular opening 29 in the cover 21 locking the device to the cover so that when the cover is turned, the agitator will be turned, or when the cover is held and the body is turned, the same effect of agitating the contents is had. The extreme end of the journal 26 is made conical as shown at 30 to guide the journal into the angular opening 29 in the cover.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A condiment holder, comprising a body having an open end, and an external annular groove adjacent its open end, a member mounted to turn on the body and engaging in the groove, said member having an angular opening located centrally over the end of the body, an agitator in the body, a journal on one end of said agitator having an angular portion and a cylindrical portion, said angular portion fitting the opening in the movable member, and means at the end of the body having a circular opening constituting a bearing for the cylindrical portion of the journal, substantially as described.

2. A condiment holder comprising a body, a perforated cover removably connected to the body, an agitator within the body having a journal projecting through the cover, said body having an annular groove, a rotary member in said groove, and an arm connected to said rotary member and removably connected to the journal, whereby the turning movement of the rotary member imparts a rotary movement to the agitator, substantially as described.

3. A condiment holder comprising a body, a perforated cover removably connected to the body, an agitator within the body having a journal projecting through the cover, said body having an annular groove, a ring mounted to turn in the groove, an arm connected to the ring, said journal at its end projecting above the cover made angular in cross section, and said arm having an angular opening to receive the angular end of the journal, substantially as described.

4. A condiment holder comprising a body, a perforated cover removably connected to the body, an agitator within the body having a journal projecting through the cover, said body having an annular groove, a ring mounted to turn in the groove and having outwardly projecting finger holds at opposite sides thereof, a sleeve fixed to the ring, an arm mounted to turn in the sleeve, said arm at its free end having an angular opening, and said journal having a conical end and an angular portion below the conical end to enter the angular opening in said arm, substantially as described.

In testimony whereof I have signed my name to this specification in the presence of two subscribing witnesses.

CLYDE RITTER.

Witnesses:
 Isaac T. Nichols,
 L. Ella Cox.